(12) United States Patent
Dong et al.

(10) Patent No.: US 9,985,311 B2
(45) Date of Patent: *May 29, 2018

(54) ELECTROLYTE FOR REDOX FLOW BATTERY AND REDOX FLOW BATTERY SYSTEM

(71) Applicant: Sumitomo Electric Industries, Ltd., Osaka-shi (JP)

(72) Inventors: Yongrong Dong, Osaka (JP); Ryojun Sekine, Osaka (JP); Kiyoaki Moriuchi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/501,150

(22) PCT Filed: Jul. 9, 2015

(86) PCT No.: PCT/JP2015/069717
§ 371 (c)(1),
(2) Date: Feb. 1, 2017

(87) PCT Pub. No.: WO2016/017393
PCT Pub. Date: Feb. 4, 2016

(65) Prior Publication Data
US 2017/0229728 A1 Aug. 10, 2017

(30) Foreign Application Priority Data
Aug. 1, 2014 (JP) .................................. 2014-158251

(51) Int. Cl.
*H01M 8/18* (2006.01)
*H01M 8/04276* (2016.01)
(Continued)

(52) U.S. Cl.
CPC ....... *H01M 8/188* (2013.01); *H01M 8/04067* (2013.01); *H01M 8/04276* (2013.01);
(Continued)

(58) Field of Classification Search
CPC .............................. H01M 8/188; H01M 8/20
See application file for complete search history.

(56) References Cited

U.S. PATENT DOCUMENTS 4,874,483 A  10/1989 Wakabayashi et al.
5,587,132 A * 12/1996 Nakajima .............. C01G 31/00
                                                         252/500

(Continued)

FOREIGN PATENT DOCUMENTS

CN         1515045 A      7/2004
CN       102683733 A *    9/2012
(Continued)

OTHER PUBLICATIONS

Machine Translation of CN 102683733 to Zilin et al. originally published Sep. 2012.*
(Continued)

*Primary Examiner* — Jonathan G Leong
(74) *Attorney, Agent, or Firm* — Venable LLP; Michael A. Sartori; Kerri M. Patterson

(57) ABSTRACT

An electrolyte for a redox flow battery has a total concentration of arsenic ions and antimony ions of 15 mass ppm or less. In an example of the electrolyte for a redox flow battery, preferably, the concentration of the arsenic ions is 10 mass ppm or less. In another example of the electrolyte for a redox flow battery, preferably, the concentration of the antimony ions is 10 mass ppm or less.

5 Claims, 1 Drawing Sheet

(51) Int. Cl.
  *H01M 8/04007* (2016.01)
  *H01M 8/0444* (2016.01)
(52) U.S. Cl.
  CPC .... *H01M 8/04477* (2013.01); *H01M 2250/10* (2013.01); *H01M 2300/0011* (2013.01)

(56) References Cited

U.S. PATENT DOCUMENTS

| | | | |
|---|---|---|---|
| 7,258,947 | B2 | 8/2007 | Kubata et al. |
| 8,394,529 | B2 | 3/2013 | Keshavarz et al. |
| 9,331,356 | B2* | 5/2016 | Dong ............... H01M 8/20 |
| 9,647,290 | B2* | 5/2017 | Sekine ............. H01M 8/188 |
| 2004/0191623 | A1* | 9/2004 | Kubata ............. H01M 8/188 429/189 |
| 2010/0143781 | A1 | 6/2010 | Keshavarz et al. |
| 2013/0157162 | A1 | 6/2013 | Dong et al. |
| 2014/0134465 | A1* | 5/2014 | Kumamoto ........ H01M 8/188 429/61 |

FOREIGN PATENT DOCUMENTS

| | | |
|---|---|---|
| EP | 0713257 A1 | 5/1996 |
| EP | 1406333 A1 | 4/2004 |
| JP | 60-115174 | 6/1985 |
| JP | 01-294368 | 11/1989 |
| JP | H02-079374 A | 3/1990 |
| JP | 03-192662 B2 | 8/1991 |
| JP | 06-260204 | 9/1994 |
| JP | 08-078042 | 3/1996 |
| JP | H08-78042 A | 3/1996 |
| JP | H08-148177 A | 6/1996 |
| JP | 2002-367657 A | 12/2002 |
| JP | 3897544 B2 | 3/2007 |
| JP | 2007-311209 A | 11/2007 |
| JP | 2011-233372 A | 11/2011 |
| JP | 2012-079678 A | 4/2012 |
| JP | 2013-008640 A | 1/2013 |
| JP | 2013-037856 A | 2/2013 |
| JP | 2014-137946 A | 7/2014 |
| JP | 5590512 B1 | 9/2014 |
| JP | 5590513 B1 | 9/2014 |
| JP | 5590514 B1 | 9/2014 |
| KR | 10-2013-0038234 A | 4/2013 |
| TW | 201327993 A | 7/2013 |
| WO | 2004/099079 A1 | 11/2004 |
| WO | 2010/138945 A2 | 12/2010 |
| WO | 2010/138945 A3 | 4/2011 |
| WO | 2012/132091 A1 | 10/2012 |
| WO | 2013/054921 A1 | 4/2013 |

OTHER PUBLICATIONS

International Search Report in counterpart International Application No. PCT/JP2015/069717, dated Sep. 1, 2015.
Notification of Reasons for Rejection in counterpart Japanese Patent Application No. 2016-538247, dated Dec. 8, 2016.
Yuehua Wen et al., "Investigation on the stability of electrolyte in vanadium flow batteries," Electrochimica Acta, 2013, 96, pp. 268-273.
Azaroual, et al., "Solubility of platinum in aqueous solutions at 25C and pHs 4 to 10 under oxidizing conditions," Geochimica et Cosmochimica Acta, Elsevier, 2001, 65, pp. 4453-4466.
Chuan, et al., "Solubility of heavy metals in a contaminated soi: Effects of redox potential and pH" Water, Air, and Soil Pollution, Aug. 1996, vol. 90, Issue 3-4, pp. 543-556. [Abstract only].
Communication in counterpart European Patent Application No. 16169163.9 dated Feb. 23, 2017.
Communication pursuant to Article 94(3) EPC for European Patent Application No. 13887472.2, dated Jul. 28, 2015.
Communication pursuant to Article 94(3) EPC in European Patent Application No. 13887535.6, dated Jul. 24, 2015.
International Preliminary Report on Patentability in PCT International Application No. PCT/JP2013/071425, dated May 1, 2014.
International Preliminary Report on Patentability in PCT International Application No. PCT/JP2013/071426, dated May 1, 2014.
International Preliminary Report on Patentability in PCT International Application No. PCT/JP2013/071427, dated May 1, 2014.
International Search Report in PCT International Application No. PCT/JP2013/071425 dated Nov. 12, 2013.
International Search Report in PCT International Application No. PCT/JP2013/071426 dated Nov. 12, 2013.
International Search Report in PCT International Application No. PCT/JP2013/071427 dated Nov. 12, 2013.
Notice of Allowance issued in U.S. Appl. No. 14/422,792, dated Apr. 7, 2017.
Notice of Allowance issued in U.S. Appl. No. 14/422,792, dated Dec. 27, 2016.
Notice of Allowance issued in U.S. Appl. No. 14/422,797, dated Feb. 29, 2016.
Notice of Decision for Patent in Korean Patent Application No. 10-2015-7004129, dated Apr. 6, 2015.
Notification of the Office Action issued in Taiwanese Patent Application No. 103127093, dated Mar. 23, 2015.
Notification of the Office Action issued in Taiwanese Patent Application No. 103127098, dated Mar. 23, 2015.
Notification of the Office Action issued in Taiwanese Patent Application No. 103127100, dated Mar. 23, 2015.
Office Action in U.S. Appl. No. 14/422,785, dated Aug. 27, 2015.
Office Action in U.S. Appl. No. 14/422,792, dated Feb. 2, 2016.
Office Action in U.S. Appl. No. 14/422,792, dated Sep. 15, 2015.
Office Action in U.S. Appl. No. 14/422,797, dated Oct. 21, 2015.
Office Action issued in U.S. Appl. No. 14/422,792, dated Aug. 12, 2016.
Product Specification, Product No. 204854, Sigma-Aldrich, 1 pg.
Product Specification, Product No. 204862, Sigma-Aldrich, 1 pg.
Product Specification, Product No. 573884, Sigma-Aldrich, 1 pg.
Supplementary European Search Report for European Patent Application No. 13887472.2, dated Jul. 2, 2015.
Supplementary European Search Report in European Patent Application No. 13887535.6, dated Jul. 2, 2015.
Supplementary European Search Report in European Patent Application No. 13887572.9, dated Jul. 2, 2015.

* cited by examiner

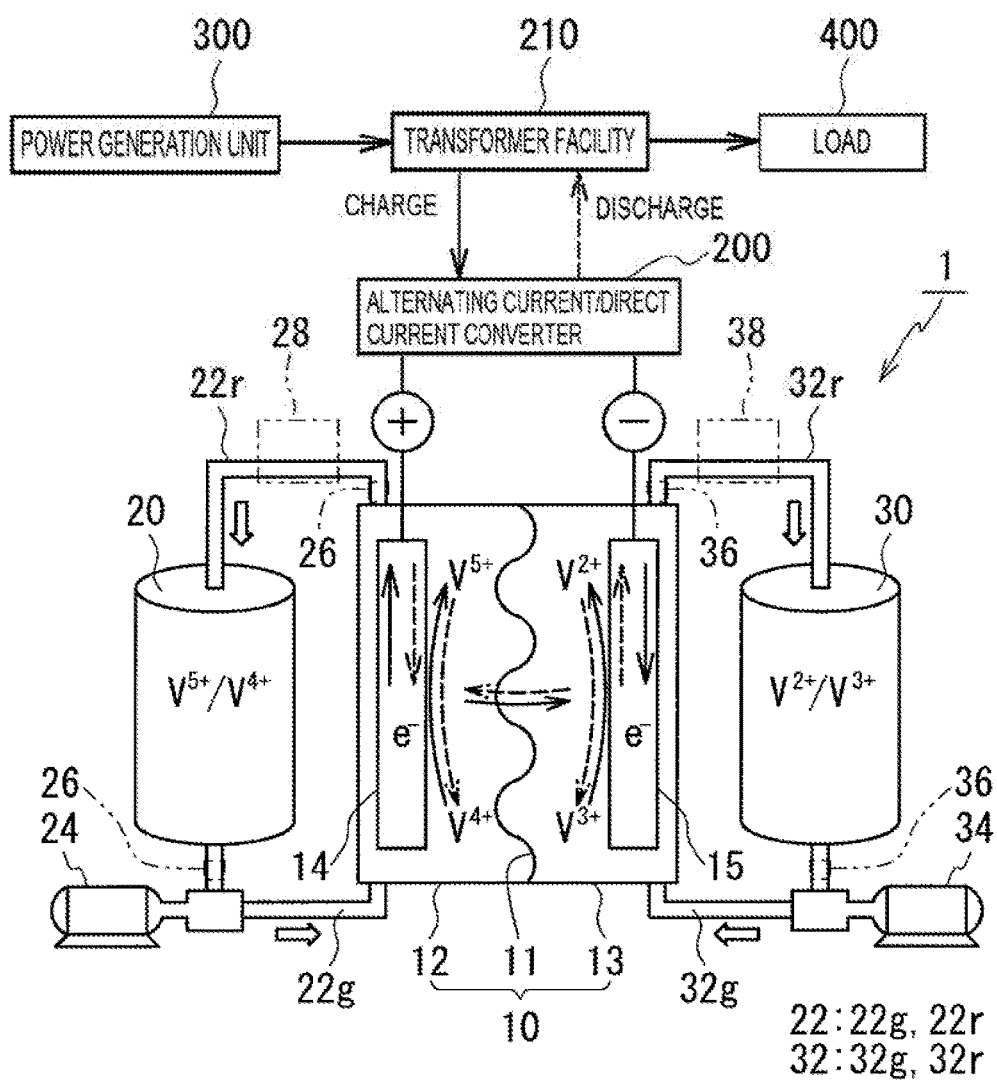

ELECTROLYTE FOR REDOX FLOW BATTERY AND REDOX FLOW BATTERY SYSTEM

TECHNICAL FIELD

The present invention relates to a redox flow battery system provided with a redox flow battery, which is a storage battery, and an electrolyte used for a redox flow battery. More particularly, the invention relates to an electrolyte for a redox flow battery and a redox flow battery system in which it is possible to reduce the generation of precipitates that are able to adhere to pipes and the like.

BACKGROUND ART

In recent years, with the electric power shortage becoming more serious, rapid introduction of natural energy, such as wind power generation and solar power generation, and stabilization of electric power systems have become issues to be addressed globally. As one of the measures to address the issues, installation of large-capacity storage batteries to achieve, for example, smoothing of output fluctuation, storage of surplus electricity, and load leveling has been receiving attention.

One of such large-capacity storage batteries is a redox flow battery (hereinafter, may be referred to as an "RF battery"). The RF battery has characteristics such as 1) ease of capacity increase to a megawatt (MW) level, 2) a long life, and 3) capability of accurately monitoring the state of charge of the battery, and is expected to be the most suitable storage battery for stabilization of electric power systems.

An RF battery mainly includes a battery cell portion including a positive electrode, a negative electrode, and a membrane disposed between the two electrodes, in which a positive electrode electrolyte and a negative electrode electrolyte are supplied, and charging and discharging are performed. Typically, a system is constructed for use, in which the battery cell portion and each of the tanks that store the electrolytes are connected with a pipe, and by providing a pump on the pipe, each electrode electrolyte is circulated and supplied to the battery cell portion.

Electrolytes used in RF batteries contain, as active materials, metal elements whose valence is changed by oxidation-reduction. Recently, as described in PTL 1 and 2, typically used are vanadium-based electrolytes containing vanadium ions as an active material for both positive and negative electrodes.

CITATION LIST

Patent Literature

PTL 1: Japanese Unexamined Patent Application Publication No. 2002-367657
PTL 2: Japanese Unexamined Patent Application Publication No. 2007-311209

SUMMARY OF INVENTION

Technical Problem

As a result of investigation by the present inventors, it has been found that, as an RF battery system is operated, precipitates adhere in particular to pipes for supplying and discharging electrolytes, among constituent members provided in the RF battery system. Accordingly, it is desired to develop an electrolyte for an RF battery and an RF battery system in which it is possible to reduce the generation of precipitates that are able to adhere to the pipes with time.

Adhesion of precipitates to the pipes may pose problems such as 1) an increase in pressure-feeding loss due to a decrease in the electrolyte flow area, 2) in heat exchange regions of the pipes for cooling electrolytes, a decrease in heat exchange efficiency, and thus degradation in battery characteristics due to insufficient cooling of the electrolytes, and 3) clogging of the pipes due to excessive adhesion of precipitates. Furthermore, in the case where the pipes are partially transparent so that the flow state of the electrolytes can be visually confirmed, problems in terms of maintenance may occur, for example, the transparency of the transparent portion may be degraded by adhesion of precipitates, making it impossible to appropriately confirm the flow state. The reason for this is that most of the precipitates are opaque.

As a result of investigation by the present inventors, it has been found that in some cases, precipitates adhering to the pipes may include compounds containing, as a main component, impurity elements which are not an active material element, unlike the compounds containing vanadium serving as an active material (e.g., ammonium-vanadium compounds) described in PTL 1. Accordingly, it is desired to develop an electrolyte for an RF battery in which it is possible to reduce the generation of not only precipitates including the active material element but also other precipitates.

PTL 2 discloses a method of removing a gas generated from an electrolyte instead of precipitates. However, even when the gas removal equipment described in PTL 2 is provided, there may be a case where, although part of the component capable of generating a gas generates a gas, the other part forms a compound while adhering to the inner surfaces of pipes or the like and cannot be discharged as a gas. In such a case, it is considered that the compound can adhere, as precipitates, to the pipes.

The present invention has been accomplished under the circumstances described above. It is an object of the present invention to provide an electrolyte for a redox flow battery and a redox flow battery system in which it is possible to reduce the generation of precipitates that are able to adhere to pipes and the like.

Solution to Problem

An electrolyte for a redox flow battery according to an embodiment of the present invention has a total concentration of arsenic ions and antimony ions, which are impurity element ions, of 15 mass ppm or less.

A redox flow battery system according to an embodiment of the present invention includes a redox flow battery to which the electrolyte for a redox flow battery is supplied.

Advantageous Effects of Invention

When the electrolyte for a redox flow battery is used in a redox flow battery system, it is possible to reduce the generation of precipitates that are able to adhere to pipes and the like. Therefore, in the redox flow battery system, it is possible to suppress an increase in pressure-feeding loss of the electrolyte, a decrease in heat exchange efficiency, and degradation in battery characteristics due to precipitates, and satisfactory operation is possible over a long period of time.

BRIEF DESCRIPTION OF DRAWINGS

FIG. 1 is an explanatory diagram showing a schematic structure of a redox flow battery system according to an embodiment and an operating principle of a battery.

DESCRIPTION OF EMBODIMENTS

Description of Embodiments of the Present Invention

The present inventors have performed various studies in order to reduce the generation of precipitates adhering to the pipes and the like. An electrolyte for an RF battery can contain, in addition to metal element ions serving as an active material, impurity ions such as impurity element ions and impurity compound ions. The impurity ions in the electrolyte for an RF battery are derived mainly from ingredients of the electrolyte, materials and members used in the process for producing the electrolyte, members used for transporting and storing the electrolyte, and various others. It is also conceivable that the impurity ions are derived from constituent members of an RF battery system with which the electrolyte for an RF battery can come into contact during operation of the RF battery system. It has been found that, among such impurity ions, there are impurity element ions which form precipitates that are likely to adhere to pipes and the like. Accordingly, on the basis of the results of component analysis of precipitates adhering to the pipes and the like, in order to decrease specific impurity elements contained in the precipitates, an operation of removing specific impurity element ions has been carried out on the electrolyte. As a result, it has been possible to reduce the generation of precipitates that are able to adhere to the pipes and the like. Furthermore, by decreasing the specific impurity element ions, it has also been possible to reduce the generation of a toxic gas. The present invention is based on these findings. The embodiments of the present invention will be enumerated and described below.

(1) An electrolyte for a redox flow battery (RF battery) according to an embodiment of the present invention has a total concentration of arsenic ions and antimony ions of 15 mass ppm or less.

Even when the electrolyte for an RF battery contains arsenic ions and antimony ions, the content of arsenic ions and antimony ions is very low. Therefore, in the electrolyte for an RF battery, it is possible to reduce the generation of precipitates that are able to adhere to pipes and the like when used in an RF battery system, i.e., precipitates composed of a compound containing at least one element of arsenic and antimony. Furthermore, in an RF battery system including the electrolyte for an RF battery (RF battery system according to an embodiment), it is possible to suppress an increase in pressure-feeding loss of the electrolyte, a decrease in heat exchange efficiency, and degradation in battery characteristics due to precipitates, and over a long period of time, clogging of pipes does not substantially occur, allowing satisfactory operation. In the case where the RF battery system includes a transparent portion, it is possible to suppress degradation in the transparency of the transparent portion over a long period of time, and excellent transparency can be maintained. Consequently, the electrolyte for an RF battery can contribute to the construction of an RF battery system having little pressure-feeding loss of the electrolyte, high heat exchange efficiency, and excellent battery characteristics and an RF battery system which can be easily controlled using a transparent portion.

Furthermore, in the electrolyte for an RF battery, since the content of arsenic ions and antimony ions is within a specific range, it is also possible to reduce the generation of a toxic gas containing at least one of the elements.

(2) In an example of the electrolyte for an RF battery according to the embodiment, the concentration of the arsenic ions may be 10 mass ppm or less.

In the embodiment described above, when used in an RF battery system, it is possible to reduce the formation of precipitates such as a compound containing at least arsenic, and it is also possible to reduce the generation of a toxic gas containing arsenic.

(3) In an example of the electrolyte for an RF battery according to the embodiment, the concentration of the antimony ions may be 10 mass ppm or less.

In the embodiment described above, when used in an RF battery system, it is possible to reduce the formation of precipitates such as a compound containing at least antimony, and it is also possible to reduce the generation of a toxic gas containing antimony.

(4) In the electrolyte for an RF battery according to the embodiment, preferably, the concentration of vanadium ions is 1 to 3 mol/L, the concentration of free sulfuric acid is 1 to 4 mol/L, the concentration of phosphoric acid is $1.0 \times 10^{-4}$ to $7.1 \times 10^{-1}$ mol/L, the concentration of ammonium is 20 mass ppm or less, and the concentration of silicon is 40 mass ppm or less.

The embodiment described above relates to an vanadium-based electrolyte which contains vanadium ions as an active material and is composed mainly of a solution containing sulfuric acid and phosphoric acid. In the embodiment described above, since the concentrations of the components are each within a specific range, the following various advantages can be obtained: 1) An excellent balance of valences in positive and negative electrodes, resulting in excellent battery characteristics such as battery efficiency; 2) The possibility to reduce the generation of gas, such as hydrogen gas, due to a side reaction accompanying the battery reaction; 3) The possibility to suppress precipitation of compounds containing the active material element, such as ammonium-vanadium compounds; and 4) The possibility to suppress gelation of the electrolyte due to silicon. That is, in the embodiment described above, it is possible to suppress precipitation of not only precipitates containing impurity elements derived from impurity element ions but also precipitates containing the active material element derived from active material element ions. Thus, the embodiment can contribute to the construction of an RF battery system having excellent battery characteristics over a long period of time.

(5) A redox flow battery system according to an embodiment of the present invention includes a redox flow battery to which the electrolyte for a redox flow battery according to any one of (1) to (4) is supplied.

In the RF battery system, since the electrolyte for an RF battery is used, it is possible to reduce the generation of precipitates that are able to adhere to pipes and the like, and it is possible to suppress an increase in pressure-feeding loss of the electrolyte, a decrease in heat exchange efficiency, and degradation in battery characteristics due to the precipitates. Furthermore, over a long period of time, clogging of pipes does not substantially occur, allowing satisfactory operation.

(6) An example of the redox flow battery system according to (5) may include a pipe for supplying and discharging the electrolyte for a redox flow battery to and from the redox flow battery, and a transparent portion provided in part of the pipe. The transparency of the transparent portion refers to a degree of transparency such that a healthy person can visually confirm the flow state of the electrolyte present inside the pipe, the presence or absence of adhesion of precipitates and the like, the color of the electrolyte, the color of precipitates, and the like, and includes translucency.

In the RF battery system, since the electrolyte for an RF battery is used, it is possible to reduce the formation of precipitates that are able to adhere to the transparent portion which is a part of the pipe. Therefore, in the RF battery system, the transparency of the transparent portion can be maintained over a long period of time, and visual checking of the electrolyte using the transparent portion can be performed satisfactorily, thus facilitating maintenance and the like.

Detailed Description of Embodiments of the Present Invention

The electrolyte for a redox flow battery (RF battery) and the redox flow battery (RF battery) system according to the embodiments of the present invention will be described in more detail below. First, with reference to FIG. 1, the RF battery system according to the embodiment will be described, and then the electrolyte for an RF battery will be described in detail. The ions inside tanks 20 and 30 shown in FIG. 1 are examples of ions contained as an active material in the electrolyte for an RF battery (examples of the type of element and the valence). In FIG. 1, solid line arrows indicate charging, and dashed line arrows indicate discharging.

•RF Battery System

An RF battery mainly includes a battery cell portion 10, is connected, typically, through an alternating current/direct current converter 200, a transformer facility 210, and the like, to a power generation unit 300 (e.g., a solar power generation apparatus, a wind power generation apparatus, a general power plant, or the like) and a load 400 such as an electric power system or consumer, performs charging using the power generation unit 300 as an electric power supply source, and performs discharging to the load 400 as an electric power supply target. In order to perform charging and discharging, an RF battery system 1, which includes the battery cell portion 10 and a circulation mechanism for circulating electrolytes to the battery cell portion 10 (tanks 20 and 30, pipes 22 and 32, and pumps 24 and 34), is constructed.

••Battery Cell Portion

The battery cell portion 10 includes a positive electrode cell 12 containing a positive electrode 14, a negative electrode cell 13 containing a negative electrode 15, and a membrane 11 which separates two electrode cells 12 and 13 and through which predetermined ions permeate.

The battery cell portion 10 is typically used in the form of a cell stack including a plurality of pairs of positive electrode cell 12 and negative electrode cell 13. A pair of positive electrode cell 12 and negative electrode cell 13 is typically formed using a cell frame including a bipolar plate (not shown) having a positive electrode 14 disposed on one surface thereof and a negative electrode 15 disposed on the other surface thereof, and a frame member (not shown) which is formed on the outer periphery of the bipolar plate. The cell frame has liquid supply holes for supplying the electrode electrolytes to the electrodes 14 and 15 and liquid drainage holes for discharging the electrode electrolytes from the electrodes 14 and 15. By stacking a plurality of cell frames, the liquid supply holes and the liquid drainage holes constitute flow paths for the electrolytes. The flow paths are connected to the pipes 22 and 32 which will be described later. The cell stack is formed by repeatedly stacking a cell frame, a positive electrode 14, a membrane 11, a negative electrode 15, a cell frame, and so on in this order.

••Circulation Mechanism

The positive electrode tank 20 which stores a positive electrode electrolyte is connected to the positive electrode cell 12 through the pipe 22. The negative electrode tank 30 which stores a negative electrode electrolyte is connected to the negative electrode cell 13 through the pipe 32. In the pipe 22 on the positive electrode side, an upstream side pipe 22g for supplying the positive electrode electrolyte from the positive electrode tank 20 to the battery cell portion 10 is provided with a pump 24. In the pipe 32 on the negative electrode side, an upstream side pipe 32g for supplying the negative electrode electrolyte from the negative electrode tank 30 to the battery cell portion 10 is provided with a pump 34. In the battery cell portion 10, by using the pipes 22 and 32 and the pumps 24 and 34, the positive electrode electrolyte in the positive electrode tank 20 and the negative electrode electrolyte in the negative electrode tank 30 are circulated and supplied to the positive electrode cell 12 (positive electrode 14) and the negative electrode cell 13 (negative electrode 15), respectively. Charging and discharging are performed in response to changes in the metal ion valence of the active material contained in the electrode electrolytes. As the basic configuration of the RF battery system 1, a known configuration can be appropriately used.

•••Pipe

The pipes 22 and 32 are typically made of a resin and made opaque from the viewpoint of weather resistance and the like. Examples of the resin include polyvinyl chloride (PVC), polyethylene (PE), polypropylene (PP), fluororesins represented by polytetrafluoroethylene (PTFE), and other various ethylene copolymers.

••••Transparent Portion

Transparent portions 26 and 36 may be provided in part of the pipes 22 and 32. The transparent portions 26 and 36 are, for example, made to serve as monitoring windows, and can be used in order to maintain the electrolytes, such as to visually confirm the flow state of the electrolytes flowing in the pipes 22 and 32, the color of the electrolytes, and the like. Depending on the type of electrolyte, the color may vary according to the valence. Therefore, the valence state can be grasped (to a certain extent) by checking the color of the electrolytes, and thus the transparent portions can be used to control the valence of the electrolytes.

The transparent portions 26 and 36 may be, for example, formed of transparent pipes made of a transparent resin or translucent resin. In this case, for example, the pipes 22 and 32 are mostly formed as opaque pipes, and by assembling the transparent pipes in part of the opaque pipes, transparent or translucent portions are provided partially in the longitudinal direction of the opaque pipes so as to extend around the circumference thereof.

Alternatively, for example, the transparent portions 26 and 36 may be provided partially in the circumferential direction and partially in the longitudinal direction of the opaque pipes, thereby forming windows made of a transparent resin or translucent resin.

The specifications (constituent resin, length, thickness, and the like) of the transparent portions 26 and 36, installation positions, the number of transparent portions to be formed, and the like can be appropriately selected. The transparent portions 26 and 36 can be provided at desired locations, such as at any positions of downstream side pipes 22r and 32r or at any positions of upstream pipes 22g and 32g. The installation positions and the number of transparent portions shown in FIG. 1 are merely examples.

••••Heat Exchange Portion

A cooling structure can be provided on part of the pipes 22 and 32. The electrolyte for an RF battery generates heat as a result of battery reactions. Because of the heat generation, in the RF battery system, battery efficiency may decrease, and the resin constituting the pipes 22 and 32 in contact with the electrolytes may degrade, for example, may soften. Accordingly, it is preferable to provide heat exchange portions 28 and 38 in part of the downstream side pipes 22r and 32r through which the electrolytes with particularly high temperature can flow, in the pipes 22 and 32.

The heat exchange portions 28 and 38 may be configured to include a pipe cooling region in which the surface area is increased by using a thin tube having a small cross-sectional area, by arranging pipes in a meandering manner, or by performing both, and a forced cooling mechanism, such as a fan or water chiller, which forcibly cools the pipe cooling region. A cooling structure having a known configuration can be appropriately used for the pipes 22 and 32.

••Constituent Materials of RF Battery System

There is a concern that the components of members that can be in contact with the electrolytes, for example, the electrode tanks 20 and 30 and the pipes 22 and 32, among the members constituting the RF battery system 1, may be mixed in the electrolytes during operation of the system 1. The contaminant may produce impurity element ions to increase the impurity element ion concentration. As a result, precipitates containing impurity elements may be formed and adhere to the pipes 22 and 32 and the like. Accordingly, as the constituent materials of the members that can be in contact with the electrolytes (including adhesives, mold release agents, and the like that have been used in the manufacturing process of the members and can remain), it is preferable to use materials which in particular do not contain arsenic ions and antimony ions or which have low contents of arsenic ions and antimony ions. Examples of such constituent materials include polyethylene and ethylene α-olefin copolymers which have a density (ASTM D 1505) of 0.080 to 0.960 g/cm$^3$ and a melt flow rate (ASTM D 1238, measurement conditions: temperature 190° C., load 2.16 kg) of 0.01 to 20 g/10 min.

•Electrolyte for an RF Battery

The electrolyte for an RF battery according to the embodiment used in the RF battery system 1 is a solution which contains metal ions serving as an active material and can contain various impurity element ions. In the electrolyte for an RF battery according to the embodiment, although arsenic ions and antimony ions can be contained as impurity element ions, a characteristic point is that the total concentration of arsenic ions and antimony ions is low. First, this characteristic point will be described below.

••Impurity Element Ions

In the electrolyte for an RF battery according to the embodiment, the total concentration of arsenic (As) ions and antimony (Sb) ions, which are impurity element ions, is 15 mass ppm or less. Within this range, when the RF battery system 1 is operated, it is possible to reduce the generation of compounds containing at least one element of arsenic and antimony, in particular, compounds containing both arsenic and antimony, with time. That is, it is possible to effectively reduce adhesion of the compounds as precipitates to the pipes 22 and 32 and the like. As the total concentration decreases, the amount of the precipitates can be decreased, which is preferable. The total concentration is preferably 14.5 mass ppm or less, and more preferably 14 mass ppm or less or 13.5 mass ppm or less. As shown in the test example which will be described later, it is considered to be preferable that, in the electrolyte for an RF battery at least in an unused state, the total concentration satisfies the range described above.

Each of the concentration of arsenic ions and the concentration of antimony ions is preferably lower from the viewpoint of decreasing the amount of the precipitates. The concentration of arsenic ions is preferably 10 mass ppm or less, and more preferably 9 mass ppm or less, 8 mass ppm or less, or 6 mass ppm. When the concentration of arsenic ions is low, it is possible to decrease the precipitation amount of compounds containing arsenic, and it is also possible to decrease the generation amount of a toxic gas containing arsenic, e.g., arsine (AsH$_3$) or the like that can be generated from the negative electrode. The concentration of antimony ions is preferably 10 mass ppm or less, and more preferably 9 mass ppm or less, 8 mass ppm or less, or 6 mass ppm. When the concentration of antimony ions is low, it is possible to decrease the precipitation amount of compounds containing antimony, and it is also possible to decrease the generation amount of a toxic gas containing antimony, e.g., stibine (SbH$_3$) or the like that can be generated from the negative electrode. When the RF battery system 1 is configured to include gas removal equipment such as a filter installed therein, as described in PTL 2 and the like, the toxic gas can be neutralized and discharged out of the system 1.

Arsenic and antimony are homologous elements of Group 15 of the periodic table and their periods are close (arsenic is an element of the fourth period, and antimony is an element of the fifth period). Therefore, it is believed that the two elements exhibit similar properties, specifically, each forms and precipitates a compound containing itself and generates a toxic gas containing itself. In the electrolyte for an RF battery according to the embodiment, it is believed that, by setting the contents of ions of a plurality of specific impurity elements which are supposed to have similar properties in specific ranges, it is possible to effectively reduce the generation of precipitates that are derived from the impurity element ions and that are able to adhere to the pipes 22 and 32 and the like.

••Method for Decreasing Impurity Element Ions

In order to decrease the concentrations of arsenic ions and antimony ions in the electrolyte for an RF battery, for example, the following measures can be used:

(1) In the process of producing the electrolyte, ingredients (active materials, solvents, and the like) which have low contents of arsenic and antimony, and preferably do not contain arsenic and antimony, are used.

(2) As the members used in the process of producing the electrolyte, members whose components have low contents of arsenic and antimony, and preferably do not contain arsenic and antimony, are used.

(3) As the members used during transportation, storage, and the like of the electrolyte (transport tanks, storage tanks, and the like), members whose components have low contents of arsenic and antimony, and preferably do not contain arsenic and antimony, are used.

(4) The electrolyte is subjected to a removal operation to remove arsenic ions and antimony ions, which will be described later.

(5) As the members that can be in contact with the electrolyte, among the members constituting the RF battery system 1, members whose components have low contents of arsenic and antimony, and preferably do not contain arsenic and antimony, are used.

The removal operation of arsenic ions and antimony ions in the electrolyte for an RF battery can be performed using various methods capable of removing element ions, such as coagulating sedimentation, solvent extraction, filtration using an ion-exchange resin or chelate resin, electrolytic deposition, and membrane separation. Any known method may be used. In particular, in filtration using a chelate resin, by adjusting properties of the chelate resin and the pH of the electrolyte, specific element ions can be selectively filtered. This filtration can be performed by passing the electrolyte for an RF battery through a filter made of the chelate resin or a column or the like packed with the chelate resin in the form of beads. By performing the removal operation, impurity element ions, which can be present in the electrolyte for an RF battery, other than arsenic ions and antimony ions may be removed simultaneously in some cases.

The removal operation described above can be performed at any time. That is, the removal operation may be performed not only before supplying the electrolyte for an RF battery to the RF battery system 1. During operation of the system 1, components in the electrolyte may be analyzed at the wait time or downtime, and on the basis of the analysis results, the removal operation may be performed. In such a manner, the concentrations of arsenic ions and antimony ions in the electrolyte for an RF batter can be set in specific ranges during operation as well as before operation of the system 1. Consequently, even when the system 1 is operated over a long period of time, it is possible to reduce the generation of precipitates that are able to adhere to the pipes 22 and 32 and the like.

••Active Material

The electrolyte for an RF battery according to the embodiment can contain various active materials. Examples of the electrolyte for an RF battery include an vanadium-based electrolyte containing vanadium ions as an active material for both electrodes (refer to FIG. 1), an iron-chromium-based electrolyte containing iron ions as a positive electrode active material and chromium ions as a negative electrode active material, a manganese-titanium-based electrolyte (two-separate-electrolyte type) containing manganese ions as a positive electrode active material and titanium ions as a negative electrode active material, a manganese-titanium-based electrolyte (one-common-electrolyte type) containing manganese ions and titanium ions for both electrodes. In particular, there is a possibility that the vanadium-based electrolyte can contain arsenic ions and antimony ions, for example, in the process of producing the electrolyte, and therefore, it is desired to appropriately perform the removal operation or the like.

In the case where the electrolyte for an RF battery according to the embodiment is an vanadium-based electrolyte, the concentration of vanadium ions in each of the positive electrode electrolyte and the negative electrode electrolyte is preferably 1 to 3 mol/L, and more preferably 1.2 to 2.5 mol/L or 1.5 to 1.9 mol/L. The effect thereof will be described later.

In the case where the electrolyte for an RF battery according to the embodiment is an vanadium-based electrolyte, vanadium ions preferably have an average valence of 3.3 to 3.7 or 3.4 to 3.6. In this case, an excellent balance of valences in both electrodes is achieved, battery reactions can be conducted satisfactorily, and it is possible to obtain excellent battery characteristics, such as battery efficiency and energy density. Furthermore, because of the excellent balance of valences, it is possible to easily reduce the occurrence of a side reaction accompanying the battery reaction. In the case where the electrolyte for an RF battery is an aqueous solution, hydrogen can be generated by a side reaction at the negative electrode. By reducing the occurrence of a side reaction, it is possible to decrease the amount of hydrogen generated, and for example, generation of hydride gas containing hydrogen can also be reduced.

••Solvent and Others that can be Contained

The electrolyte for an RF battery according to the embodiment may be an acid solution containing the active material, and in particular an aqueous solution of an acid. The acid solution may contain, for example, at least one acid or salt selected from sulfuric acid ($H_2SO_4$), $K_2SO_4$, $Na_2SO_4$, phosphoric acid ($H_3PO_4$), $H_4P_2O_7$, $K_2HPO_4$, $Na_3PO_4$, $K_3PO_4$, nitric acid ($HNO_3$), $KNO_3$, hydrochloric acid (HCl), and $NaNO_3$. Alternatively, the electrolyte for an RF battery may be an organic acid solution.

In the case where the electrolyte for an RF battery according to the embodiment is an vanadium-based electrolyte which is a sulfuric acid solution containing phosphoric acid, preferably, the concentration of vanadium ions is in the specific range described above, the concentration of free sulfuric acid is 1 to 4 mol/L, the concentration of phosphoric acid is $1.0 \times 10^{-4}$ to $7.1 \times 10^{-1}$ mol/L, the concentration of ammonium ($NH_4$) is 20 mass ppm or less, and the concentration of silicon (Si) is 40 mass ppm or less. By setting the concentration of vanadium ions and the concentration of free sulfuric acid in the ranges described above, it is possible to obtain an electrolyte having the excellent balance of valences. Furthermore, in the combination of the concentration of vanadium ions, the concentration of free sulfuric acid, and the concentration of phosphoric acid satisfying the specific ranges described above, precipitates containing the active material element, i.e., vanadium compounds, are unlikely to precipitate, and excellent battery performance can be maintained over a long period of time. When the concentration of ammonium is in the specific range described above, it is possible to easily suppress precipitation of ammonium-vanadium compounds among the vanadium compounds. When the concentration of silicon is in the specific range described above, it is possible to suppress the occurrence of phenomena that can adversely affect the membrane 11. That is, in the embodiment, it is possible to reduce the generation of precipitates derived from active material element ions in addition to precipitates derived from impurity element ions, and battery reactions can be conducted satisfactorily.

Furthermore, in the combination of the concentration of vanadium ions, the concentration of free sulfuric acid, the concentration of phosphoric acid, and the concentration of ammonium satisfying the specific ranges described above, the concentration of free sulfuric acid is more preferably 1.5 to 3.5 mol/L. The concentration of phosphoric acid is more preferably $1.0 \times 10^{-3}$ to $3.5 \times 10^{-1}$ mol/L. The concentration of ammonium is more preferably 10 mass ppm or less. The concentration of silicon is more preferably 30 mass ppm or less. In order to decrease the concentration of ammonium and the concentration of silicon, a known method such as filtration using a filter (refer to PTL 1 and the like) can be used.

Test Example 1

A charge and discharge test was performed, in which various electrolytes for an RF battery were prepared and circulated and supplied to an RF battery system. Then, the pipes included in the system were visually checked.

In this test, an RF battery system including, as an RF battery (battery cell portion), a cell stack in which a plurality of battery cells (pairs of positive electrode cell and negative electrode cell) were stacked, and a circulation mechanism for circulating and supplying electrolytes to the cell stack, i.e., pipes, pumps, and tanks, was constructed (refer to FIG. 1). Each of the battery cells of the cell stack included electrodes having an electrode area of 500 cm² and made of carbon felt and a cell frame. The output capacity of the RF battery system was 1 kW×5 hr.

In this test, the RF battery system was constructed so as to include transparent pipes as transparent portions in part of the pipes. The transparent pipes were made of hard vinyl chloride (polyvinyl chloride) and had dimensions of 16 mmϕ in inside diameter, 22 mmϕ in outside diameter, 3 mm in thickness, and 15 cm in length. The transparent pipes were installed at the following four locations:

1. Between the supply port of the positive electrode tank and the introduction port of the RF battery (the cell stack constituting the battery cell portion); in FIG. 1, part of the pipe 22g on the upstream side of the positive electrode (transparent pipe 1 in Table 1).
2. Between the discharge port of the cell stack and the return port of the positive electrode tank; in FIG. 1, part of the pipe 22r on the downstream side of the positive electrode (transparent pipe 2 in Table 1).
3. Between the supply port of the negative electrode tank and the introduction port of the cell stack; in FIG. 1, part of the pipe 32g on the upstream side of the negative electrode (transparent pipe 3 in Table 1).
4. Between the discharge port of the cell stack and the return port of the negative electrode tank; in FIG. 1, part of the pipe 32r on the downstream side of the negative electrode (transparent pipe 4 in Table 1).

The electrolytes for an RF battery prepared in this test were sulfuric acid aqueous solutions containing vanadium ions as an active material for both electrodes, i.e., vanadium-based electrolytes. The amount of electrolyte prepared for each sample was 175 liter for the positive electrode electrolyte and 175 liter for the negative electrode electrolyte (350 liter in total for positive and negative electrodes). Furthermore, the electrolytes for an RF battery of the individual samples had the following components in common.

Concentrations in the electrolyte (common to all the samples)
  Concentration of vanadium ions: 1.7 mol/L
  Average valence of vanadium ions: 3.5
  Concentration of free sulfuric acid: 2.0 mol/L
  Concentration of phosphoric acid: 0.14 mol/L ($1.4 \times 10^{-1}$ mol/L)
  Concentration of ammonium: 20 mass ppm or less
  Concentration of silicon: 40 mass ppm or less Note that the concentration of free sulfuric acid is not the concentration of sulfate ions. The electrolyte includes vanadium sulfate, water, and sulfuric acid. The concentration of sulfate ions in the electrolyte is derived from vanadium sulfate and sulfuric acid. The concentration of sulfate ions derived from sulfuric acid is defined as the concentration of free sulfuric acid.

The electrolytes for an RF battery of Sample Nos. 1-1 to 1-6 were passed through a column packed with a chelate resin to adjust the concentration of impurity element ions, and then subjected to concentration measurement which will be described below.

Before the charge and discharge test which will be described below, the prepared electrolytes for an RF battery of the individual samples were subjected component analysis, and the concentration of arsenic ions and the concentration of antimony ions were measured. The results thereof are shown in Table 1. The concentrations were measured using an ICP mass spectrometer (manufactured by Agilent Technologies. Inc., Agilent 7700x ICP-MS).

The prepared electrolytes for an RF battery of the samples were each circulated and supplied to the RF battery system, and a charge and discharge test was performed under the following conditions. This test was performed for 100 cycles. After the charge and discharge test, the transparent pipes at the four locations described above were visually checked. The results thereof are shown in Table 1. The visual checking was performed by a plurality of (four, in this case) healthy persons. In the case where one or more out of four persons were not able to confirm the electrolyte in the transparent pipes, it was considered that transparency was degraded because of adhesion of precipitates to the transparent pipes, and the sample was evaluated as Bad. In the case where all of four persons were able to confirm the electrolyte in the transparent pipes, it was considered that transparency was maintained because of little or no adhesion of precipitates to the transparent pipes, and the sample was evaluated as Good.

(Charge and Discharge Conditions)
  Charge and discharge method: continuous charge and discharge at constant current
  Current density: 70 (mA/cm²)
  End-of-charge voltage: 1.55 (V) cell
  End-of-discharge voltage: 1.00 (V)/cell
  Temperature: room temperature (25° C.)

TABLE 1

| | | | | Transparency of transparent pipe | | | |
|---|---|---|---|---|---|---|---|
| | | | | 1 | 2 | 3 | 4 |
| | Ion concentration in electrolyte (mass ppm) | | | Near outlet of positive electrode tank | Near outlet of positive electrode cell | Near outlet of negative electrode tank | Near outlet of negative electrode cell |
| Sample No. | Arsenic As | Antimony Sb | Total As + Sb | | | | |
| 1-100 | 10.8 | 8.6 | 19.4 | Bad | Bad | Bad | Bad |
| 1-110 | 7.9 | 10.0 | 17.9 | Bad | Bad | Bad | Bad |
| 1-1 | 9.1 | 5.6 | 14.7 | Good | Good | Good | Good |
| 1-2 | 5.3 | 8.9 | 14.2 | Good | Good | Good | Good |
| 1-3 | 10.0 | 5.0 | 15.0 | Good | Good | Good | Good |
| 1-4 | 7.0 | 6.0 | 13.0 | Good | Good | Good | Good |
| 1-5 | 6.0 | 7.5 | 13.5 | Good | Good | Good | Good |
| 1-6 | 5.0 | 10.0 | 15.0 | Good | Good | Good | Good |

As is evident from Sample Nos. 1-1 to 1-6 in Table 1, when the total concentration of arsenic ions and antimony ions is 15 mass ppm or less, it is possible to reduce the generation of precipitates that are able to adhere to the pipes to such an extent that transparency of the transparent pipes can be maintained. Furthermore, each of the concentration of arsenic ions and the concentration of antimony ions was 10 mass ppm or less, and the evaluation result in terms of transparency was Good. In particular, in Sample Nos. 1-4 and 1-5, the total concentration of arsenic ions and antimony ions was 13.5 mass ppm or less, and it was found that it was possible to maintain higher transparency than that of the other samples. Furthermore, since each of the concentration of arsenic ions and the concentration of antimony ions was low, the generation amounts of a gas containing arsenic and a gas containing antimony were small, and it was possible to reduce the generation of the gases sufficiently. In addition, when the electrodes made of carbon felt and the like were checked, it was found that it was possible to reduce adhesion of precipitates containing the active material element, such as ammonium-vanadium compounds.

On the other hand, regarding Sample Nos. 1-100 and 1-110, it was confirmed that transparency was degraded because precipitates had adhered to the inside of the transparent pipes. In Sample No. 1-110, although each of the concentration of arsenic ions and the concentration of antimony ions was 10 mass ppm or less, the total concentration of arsenic ions and antimony ions exceeded 15 mass ppm, and the evaluation result in terms of transparency of the transparent pipes was Bad. Analysis of components of the adhering precipitates with an energy dispersive X-ray analyzer (manufactured by Hitachi High-Technologies Corporation, S-3400N) showed that arsenic and antimony were main components. It has been confirmed from the above that there are impurity element ions which form compounds containing the element ions themselves in the form of precipitates, and at least part of the precipitates is able to adhere to the pipes.

The results of Table 1 have confirmed that by setting the total concentration of arsenic ions and antimony ions in the electrolyte for an RF battery at 15 mass ppm or less, it is possible to reduce the generation of precipitates derived from impurity element ions. In particular, the test shows that it is preferable to set the total concentration of arsenic ions and antimony ions in the electrolyte for an RF battery at 15 mass ppm or less before operation of the RF battery system (in an unused state). Furthermore, from this point of view, it is considered to be preferable to adjust the total concentration within a short period of use after the start of operation of the RF battery system (although depending on the capacity of the RF battery or the like, for example, in a battery with a capacity of 10 kWh or more, within about 100 cycles). Since the generation of precipitates can be reduced, it is anticipated that it is possible to effectively suppress problems due to the precipitates, such as an increase in pressure loss, a decrease in heat exchange efficiency, degradation in battery characteristics, and a decrease in transparency. Furthermore, during and after charging and discharging of the RF battery system, there is a possibility that at least one of the concentration of arsenic ions and the concentration of antimony ions will change, and therefore, the removal operation described above or the like may be performed at an appropriate time.

The present invention is not limited to the examples shown above, but is defined by appended claims, and is intended to include all modifications within the meaning and scope equivalent to those of the claims. For example, in the test example, the type and concentration of active material, the type of acid and acid concentration of the electrolyte for each electrode, the amount of the electrolyte, the size of the electrodes, the capacity of the RF battery, and the like can be appropriately changed.

INDUSTRIAL APPLICABILITY

Redox flow batteries according to the present invention can be used as large-capacity storage batteries, with respect to natural energy power generation, such as solar power generation or wind power generation, for the purpose of stabilizing fluctuation of power output, storing generated power during oversupply, leveling load, and the like. Furthermore, redox flow batteries according to the present invention can be provided in a general power plant and used as large-capacity storage batteries as countermeasures against voltage sag/power failure and for the purpose of leveling load. The electrolytes for a redox flow battery according to the present invention can be used as electrolytes of the redox flow batteries.

REFERENCE SIGNS LIST 1 redox flow battery system
10 battery cell portion (RF battery)
11 membrane
12 positive electrode cell
13 negative electrode cell
14 positive electrode
15 negative electrode
20 positive electrode tank
30 negative electrode tank
22, 22g, 22r, 32, 32g, 32r pipe
24, 34 pump
26, 36 transparent portion
28, 38 heat exchange portion
200 alternating current/direct current converter
210 transformer facility
300 power generation unit
400 load

The invention claimed is:

1. An electrolyte for a redox flow battery having arsenic and antimony ions and having a total concentration of arsenic ions and antimony ions of 15 mass ppm or less,
   a concentration of vanadium ions of 1 to 3 mol/L,
   a concentration of free sulfuric acid of 1 to 4 mol/L,
   a concentration of phosphoric acid of $1.0 \times 10^{-4}$ to $7.1 \times 10^{-1}$ mol/L,
   a concentration of ammonium of 20 mass ppm or less,
   a concentration of silicon of 40 mass ppm or less, and
   the vanadium ions have an average valence of 3.3 to 3.7.

2. The electrolyte for a redox flow battery according to claim 1, wherein the concentration of the arsenic ions is 10 mass ppm or less.

3. The electrolyte for a redox flow battery according to claim 1, wherein the concentration of the antimony ions is 10 mass ppm or less.

4. A redox flow battery system comprising a redox flow battery to which the electrolyte for a redox flow battery according to claim 1 is supplied.

5. The redox flow battery system according to claim 4, further comprising;
   a pipe for supplying and discharging the electrolyte for a redox flow battery to and from the redox flow battery; and
   a transparent portion provided in part of the pipe.

\* \* \* \* \*